INVENTOR.
HENDERSON Y. STEWART
KENNETH R. GRADY
BY
L. S. Saulsbury
ATTORNEY

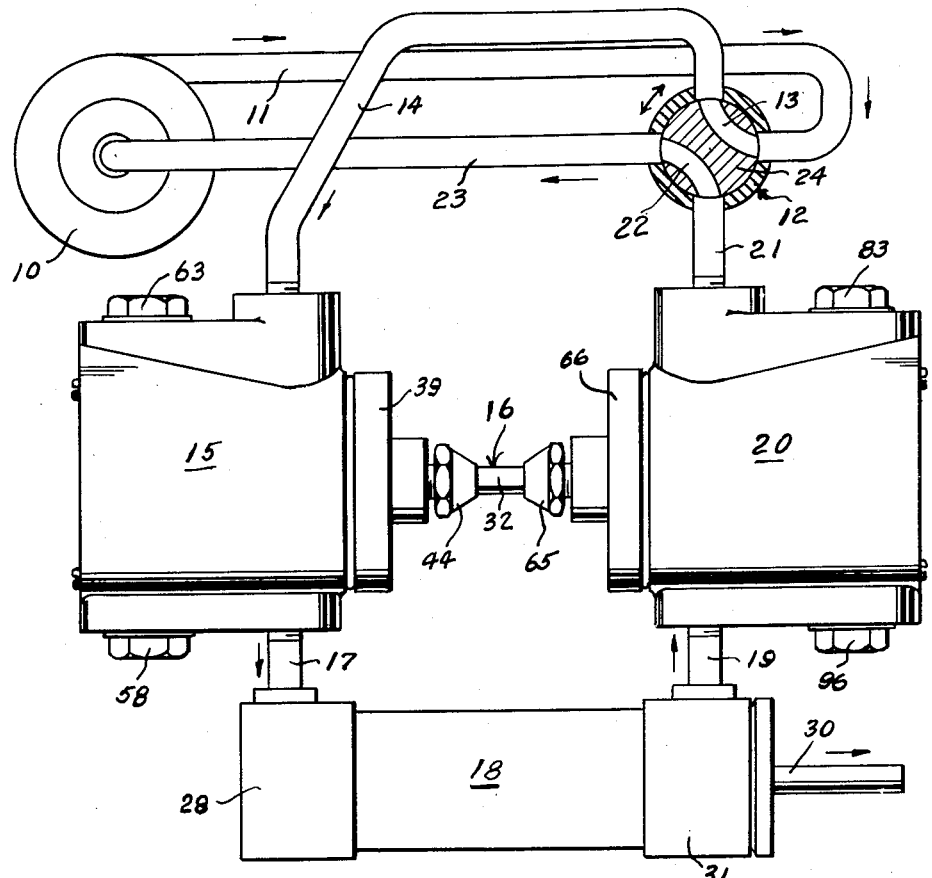
Fig. 1
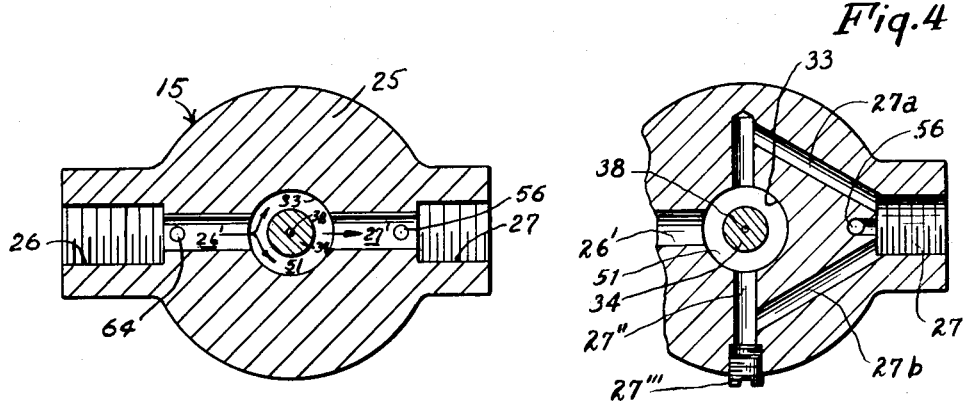
Fig. 3
Fig. 4
INVENTOR.
HENDERSON Y. STEWART
KENNETH R. GRADY
BY
L. S. Saulsbury
ATTORNEY July 31, 1956  H. Y. STEWART ET AL  2,756,724
SAFETY VALVE LOCK ARRANGEMENT
Filed June 23, 1955  2 Sheets-Sheet 2

United States Patent Office 2,756,724
Patented July 31, 1956

2,756,724

SAFETY VALVE LOCK ARRANGEMENT

Henderson Y. Stewart, Dallas, and Kenneth R. Grady, Garland, Tex.

Application June 23, 1955, Serial No. 517,522

3 Claims. (Cl. 121—40)

This invention relates to a safety valve arrangement to automatically lock oil in both sides of a hydraulic cylinder when the flow of supply oil into the cylinder is stopped or has failed.

It is a principal object of the present invention to provide a hydraulic safety lock valve arrangement wherein upon failure of the supply system, the piston of the hydraulic cylinder and the part to which it has been connected will be held and retained by the oil column on both sides of the piston and thereby prevent accident or failure of the mechanism or machine with which the work cylinder is associated.

It is another object of the invention to provide a hydraulic safety lock valve arrangement for double-acting cylinders that will work in conjunction with the shut off or reversing valve of the system and serves not only to lock the piston upon operation of the reversing or shut off valve or line failure but provides means at all times to lock the piston in the work cylinder in its exact position when the reversing valve is actuated and in that manner serves as a working partner with the shut off or reversing valve of the system.

It is still another object of the invention to provide a hydraulic safety lock valve arrangement for work cylinders which is not dependent upon back pressure to operate any of the valve elements in the arrangement but merely requires a flowing inward supply pressure to hold the valve elements open for normal operation in both the instant inlet and outlet ends of the work cylinder, such pressure being supplied from the hydraulic pressure source and the flow of pressure through the arrangement being in one direction to open one set of the valve elements and in the opposite direction to open another set of valve elements when reversing the movement of the piston in the work cylinder, in all cases the valve elements being used are opened by forward supply pressure.

It is a further object of the invention to provide in a hydraulic safety valve arrangement for work cylinders which will automatically bleed itself to function and to keep the main valve elements of the arrangement open for cycle operation and allow for the actuation of their springs to move the valve pistons to their closing positions, either by normal operation or by line failure.

It is a still further object of the invention to provide in a hydraulic safety lock valve arrangement for work cylinders, piston valves and ports for the oil leaving the piston valve chambers lying on opposite sides thereof, thereby splitting the line on the oil passing to the pressure side of the work cylinder so as to equalize the pressure on both sides of the piston valve cylinder and thereby eliminate side pressure upon the piston valve and any tendency for the valve piston to fail to function freely.

Other objects of the invention are to provide a safety valve arrangement for work cylinders having the above objects in mind, which is of simple construction, inexpensive to manufacture, has a minimum number of parts, compact, free of any tendency to stick, easy to install in a hydraulic system and upon the work cylinder, has long life, durable, effective and efficient in operation.

For other objects and for a better understanding of the invention, reference may be had to the following detailed description taken in connection with the accompanying drawing, in which:

Figure 1 is a diagrammatic view of a hydraulic system incorporating the hydraulic safety lock valve arrangement of the present invention;

Fig. 3 is a transverse sectional view of the valve arrangement as viewed on line 5—5 of Fig. 2;

Fig. 4 is a sectional view taken generally in the same plane of a slightly modified form of the invention and showing a split line from the valve piston cylinder to the work cylinder.

Figure 2:
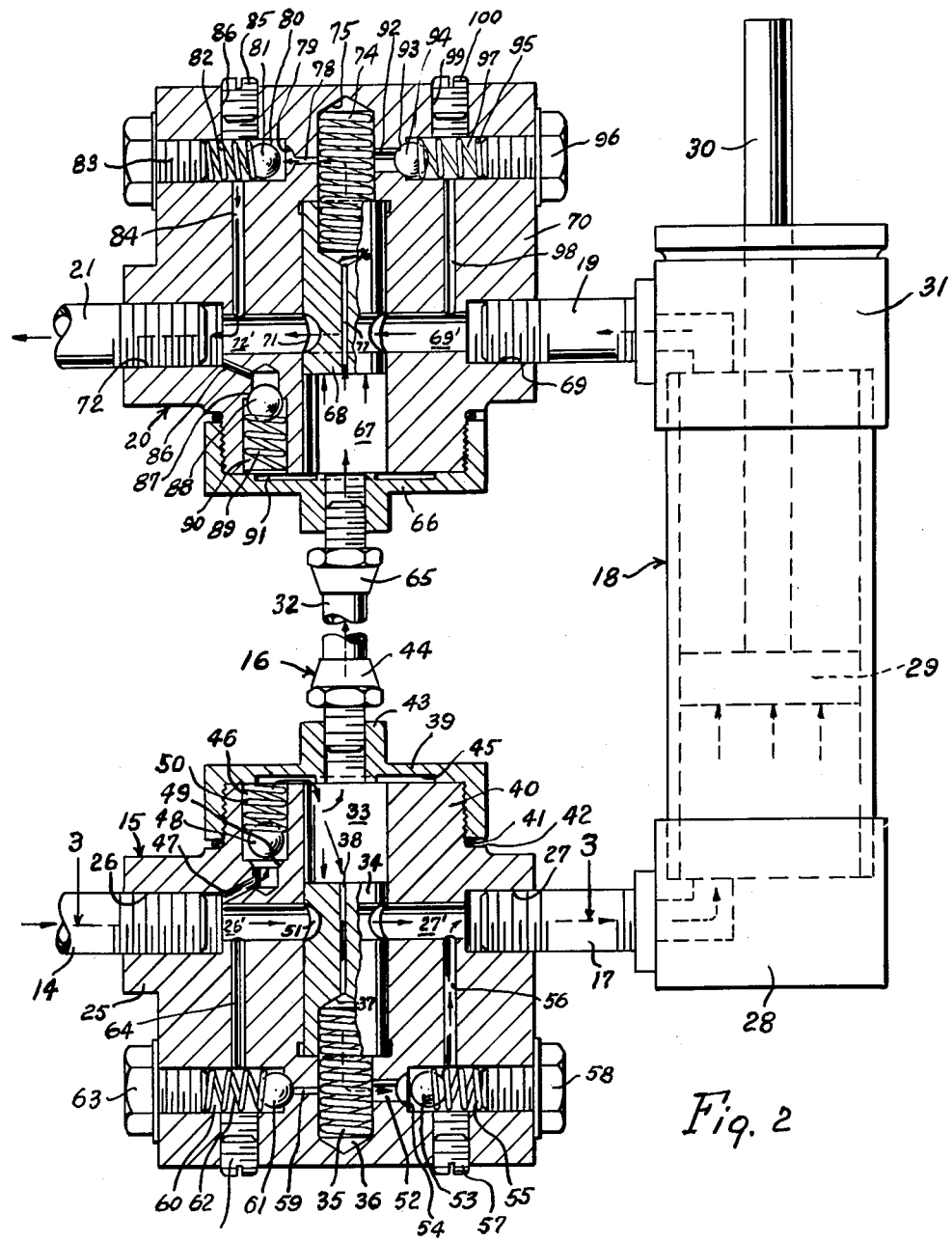
Fig. 2 is an enlarged sectional view taken through the units of the hydraulic safety lock valve arrangement, with illustration being made to the flow of the oil through the valve arrangement and to and from the work cylinder.

Referring now to the figures, 10 represents the hydraulic pressure source having an oil pressure supply line 11 that leads to a four-way reversing valve or control valve 12. From this valve 12 fluid entering the same from the pressure supply line 11 passes through an arcuate passage 13 to supply line 14 to a unit 15 of safety lock valve arrangement 16 of the present invention. Oil delivered to the unit 15 is delivered through a pipe 17 to one end of a work cylinder 18. Fluid is exhausted from the opposite end of the work cylinder 18 through pipe 19 to unit 20 of the safety lock valve arrangement 16 and then through pipe 21 to valve 12, arcuate valve passage 22, return pipe line 23 leading from the valve 12 to the fluid pressure source 10. The arcuate passages 13 and 22 are provided in a rotatable valve element 24 of the valve 12 and when the valve element 24 is turned to the position shown in Fig. 1, the flow of fluid through the system is in the direction just described, but upon the valve being turned so that the arcuate passage 22 connects the supply line 11 to the pipe 21, and the arcuate passage 13 connects the pipe 14 with the return pipe 23, the flow of oil through the system will be reversed, and the work cylinder will be operated in the opposite direction. The valve 12 thus constitutes a reversing valve. By the provision of the safety valve lock arrangement 16 in the system and connected to the opposite ends of the work cylinder 18, the work cylinder will be held in any position to which it has been moved upon failure of a supply of fluid pressure, or upon moving the valve element 24 to a neutral position where the passages 13 and 22 are disconnected from the pipe lines. The construction and operation of the safety lock valve arrangement will now be described.

Referring now particularly to Fig. 2, the valve unit 15 comprises a valve housing or casting 25 having an inlet port 26 to which the supply pipe 14 is connected and an outlet port 27 to which the pipe 17 is connected that delivers pressure to the work cylinder 18 and into cylinder head 28 and against piston 29 that is moved in the direction of the arrows shown in Fig. 2 and its piston rod 30 through a head 31 on the opposite end of the cylinder. A hose connection 32 connects unit 15 with the unit 20. The casing 25 has a cylinder 33 in which piston valve element 34 is slidable. This piston 34 is normally urged to its raised position by a compression spring 35 extended upwardly from a recess 36 in the bottom of the cylinder 33 and into a recess 37 in the lower end of the piston 34. A small hole 38 extends from the upper end of the piston 34 to the recess 37 to allow oil to pass into the bottom of the cylinder 33.

The upper end of the cylinder 33 is closed by a cap 39 fastened upon a threaded projection 40 on the valve housing or casting 25 and sealed by a ring 41 compressed against the shoulder 42.

The cap 39 has an internally-threaded projection 43 to which hose fitting 44 of the hose connection 32 is attached. The cap 39 is relieved on its underside by an annular recess 45 to allow communication of fluid from a one-way ball valve chamber 46 to the piston valve cylinder 33. A passage 47 leads from the inlet port 26 to the valve chamber 46. This passage is normally closed by a ball 48 forced against its seat 49 in the bottom of the chamber 46 by a compression spring 50.

When oil under pressure is delivered to the inlet port 26, the ball 48 is lifted from its seat 49 and oil under pressure will pass from the annular recess 45 in the cap 39 to piston valve chamber 33 through the small central hole 38 in the piston and will cause the piston 34 to be moved to its open position in the bottom of the cylinder 33. The hole 38 is about twenty thousandths of an inch in diameter and allows for the flow of oil so as to keep the piston 34 in its open position for the cycle of operation and to allow the spring 35 to move the piston upwardly in the cylinder 33 to a closed position when the flow of oil into the inlet port 26 has ceased or been stopped either by normal operation, as by turning the valve element 24 of the reversing control valve 22, or by line failure.

The inlet port 26 has an extension 26' that leads to the piston valve chamber 33, and the outlet port 27 has an extension 27', that leads from the valve chamber 33. In the periphery of the piston 34 is an annular groove 51 to allow for the direct flow of oil from the inlet extension 26' to the outlet extension 27' and directly through pipe 17 to the head 28 of the work cylinder 18 to move the piston 28 in the direction indicated in Fig. 2.

The supply of oil leading through the small passage 38 into the bottom of the chamber 33 and into spring recess 36 is delivered under pressure into a by-pass hole 52 to lift a ball valve 53 from its seat 54 against action of a spring 55 and thence upwardly through passage 56 to the outlet extension 27'. The hole 52 has a diameter of three-sixteenths of an inch and only a minimum of pressure is required to move the ball valve 53 from its seat 54 and the piston to its lowered or open position. A plug 57 closes off the opening through which the passage 56 was drilled. A bolt 58 enters the ball valve chamber to retain compression spring 55.

On the opposite side of the casting is a small hole 59 of about thirty thousandths of an inch leading from the spring recess 36 to a ball valve chamber 60 and is normally closed by a one-way ball valve 61 under the action of a compression spring 62 that is held in the chamber 60 by a bolt 63. This valve 61 is opened only when the unit is used to discharge the oil and serves to bleed the oil passing to the bottom of the valve chamber as will be later described in connection with the unit 20.

At the same time the piston 34 is depressed in the valve unit 15, oil under pressure is delivered upwardly through the cap 39, coupling 44, hose connection 32 to a coupling 65, cap 66, chamber 67 and valve piston 68 is moved to its open position so that exhaust oil from the cylinder head 31 of the work cylinder is delivered by pipe 19 to inlet port 69 in housing or casting 70 of the unit 20, inlet extension 69', groove 71 around the valve piston 68, outlet portion extension 72', outlet port 72 and finally through pipe 21 to reversing valve 12. The piston valve 68 is normally urged to its closing position by a compression spring 74 in a recess 75 of the housing 70 and recess 76 in the valve piston with which a small central hole 77 communicates to allow oil to pass to the bottom of the cylinder 67 so as to allow the spring 74 to close the piston valve when the flow of oil has been stopped either by normal operation or by line failure and to keep the piston valve in the open position during the cycle of operation. The oil passing upwardly through the central hole 77 enters spring recess 75 and is discharged through small hole 78 past seat 79 in the ball valve chamber 80 against which ball 81 is retained by compression spring 82 retained in the chamber 80 by a bolt 83. A hole 84 delivers oil to outlet extension 72' and outlet port 72. A plug 85 closes opening 86 through which the hole 84 was drilled.

This describes the unit 20 when it is being operated for discharge of oil from the work cylinder. Upon reversing the movement of the work cylinder, the unit 15 will be operated in the same manner as just described, and the unit 20 would be operated as the delivery unit and in the manner as described above in connection with unit 15. In both instances, the valve arrangement and both units thereof are dependent upon the supply oil pressure for operation, and they do not require back or return pressure for their operation.

Upon the unit 20 becoming a delivery unit and the unit 15 becoming a discharge unit as when the reversing valve 12 is turned to cause the arcuate passage 22 thereof to be aligned with pipes 11 and 21, Fig. 1, oil under pressure will be delivered from port 72 through passage 86 past valve seat 87 and ball valve 88 normally held on its seat by compression spring 89 into chamber 90, annular passage 91 in the cap 66 to chamber 67 whereby to cause the valve piston 68 to be moved to its open position so that oil will flow in the reverse direction from that indicated in the unit 20 through port 69 and pipe 19 to cylinder head 31 so that the movement of the piston 29 is reversed.

At the same time oil will be discharged from the other side of the piston 29 through the piston head 28 to pipe 17, port 27 past piston valve 34, port 26 and pipe 14 in the reverse manner than that indicated by the arrows so that the unit 15 serves as a discharge unit and will be kept open while in operation by supply pressure and independent of back or return pressure.

The delivery unit 15 will have been conditioned for operation by the flow of oil from the unit 20 through the cap 66, coupling 65, hose connection 32, coupling 44, cap 39, chamber 33 to operate the valve 34 in the chamber 15.

The oil that passes through the small hole 77 in the piston 68 and into the recess 75 to keep the piston valve 67 open passes outwardly through a port 92 past valve seat 93, ball valve 94 held on the seat by spring 95 and retaining bolt 96 in a chamber 97 and passage 98 to port extension 69' to enter the pipe 19 along with the oil being delivered thereto directly from the annular groove 71 and in the same manner that valve 53 was opened when the flow of delivery oil was made to the unit 15. A threaded hole 99 through which the hole 98 was drilled is closed by a plug 100. The ball valves 53 and 94 are also held closed by discharge pressures.

In Fig. 4, the outlet port extension is formed of drilled passages 27a and 27b extending to the opposite sides of the piston valve chamber 33 so as to equalize the pressure on both sides of the piston and eliminate any tendency of the piston to be forced against one side of the chamber. The chamber ends of the passages 27a and 27b are formed of a hole 27" drilled through opposite sides of the valve chamber and closed by a plug 27'''.

It should now be apparent that failure of pressure upstream and in any part of the pressure supply line or source locks the piston 29 of the work cylinder and prevents movement of the piston in either direction since this supply pressure is to hold both units open.

It should also be apparent that this valve arrangement may be incorporated in the cylinder heads of the work cylinder 18 and the connection 32 would be made through and along the cylinder wall to interconnect the cylinder head units.

While various changes may be made in the detail construction, it shall be understood that such changes shall be within the spirit and scope of the present invention as defined by the appended claims.

What is claimed is:

1. A safety valve arrangement for work cylinders operable in response to supply pressure comprising two identical units connected to the opposite ends of the work cylinder, conduit means connecting the units together, each of said units having a piston valve chamber with a piston valve operable therein between open and closed positions, inlet and outlet ports communicating with said chamber and adapted to be opened and closed by a piston valve upon the same being moved between closed and open positions within the chamber, a one-way valve controlled passage communicating between the inlet port to deliver fluid under pressure to one side of the valve to move the valve to its open position, a spring normally urging the piston valve to its closed position, said piston valve having a hole therethrough to permit the flow of oil to the bottom side of the chamber, and to allow the spring to close the piston when the flow of oil to the valve arrangement is stopped, one-way valve passage means communicating between the bottom side of the valve chamber and the outlet port and a third one-way valve controlled passage means communicating between the bottom side of the valve chamber and the inlet port and operable as a by-pass upon the unit being used on the discharge end of the work cylinder and said units through the connection means between them thereby having a piston valve opened in response to supply pressure.

2. A valve arrangement for work cylinders operable in response to supply pressure as defined in claim 1, and each of said housings having a projection through which the cylinder extends, a cap secured to said projection and having annular recess spanning the first mentioned one-way valve controlled passage means and the piston chamber to permit the communication of fluid pressure to the chamber to move the valve to its open position, and said conduit means connected between the caps of the unit to deliver the oil from the delivery unit to the discharging unit.

3. A valve arrangement for work cylinders operable in response to supply pressure as defined in claim 1, and said outlet port including split passage means extending from the opposite sides of the piston chamber whereby to equalize the pressure on both side of the cylinder and eliminate side pressure of the piston upon one side of the chamber.

No references cited